United States Patent [19]

Matsumoto et al.

[11] Patent Number: 5,593,258

[45] Date of Patent: Jan. 14, 1997

[54] TOOL HOLDER

[75] Inventors: Masakazu Matsumoto; Masahiro Taguchi; Yusaku Yamamoto, all of Osaka, Japan

[73] Assignee: Nikken Kosakusho Works Ltd., Osaka-fu, Japan

[21] Appl. No.: 538,737

[22] Filed: Oct. 3, 1995

[30] Foreign Application Priority Data

Oct. 25, 1994 [JP] Japan ................................. 6-260615

[51] Int. Cl.⁶ ........................... B23C 5/26; B23B 31/20; B23B 31/117
[52] U.S. Cl. .................... 409/234; 279/46.5; 279/46.8; 279/103; 408/239 R
[58] Field of Search .................................. 409/232–234; 408/239 R, 239 A, 240; 279/51–53, 102, 103, 46.5, 46.7, 46.8, 49, 54

[56] References Cited

U.S. PATENT DOCUMENTS

| | | | |
|---|---|---|---|
| 3,136,561 | 6/1964 | McAuliffe et al. | 279/46.7 |
| 3,554,080 | 1/1971 | Hermann | 409/234 |
| 3,815,930 | 6/1974 | Mattes | 279/46.7 |
| 4,621,960 | 11/1986 | Tollner | 409/234 |
| 4,714,389 | 12/1987 | Johne | 408/240 |
| 4,840,520 | 6/1989 | Pfalzgraf | 409/232 |
| 4,958,968 | 9/1990 | Von Haas et al. | 409/234 |
| 5,265,990 | 11/1993 | Kuban | 409/232 |

*Primary Examiner*—Steven C. Bishop
*Attorney, Agent, or Firm*—Ladas & Parry

[57] ABSTRACT

A tool holder has a main sleeve to be attached to a tapered bore of a spindle of a machine tool, and a subholder which is coupled with the main sleeve and to which a tool is attached. The tapered shank of the main sleeve is inserted into the tapered bore of the spindle having a taper of 7/24. The main sleeve has a tapered hole having a taper of 1/10. A tapered sleeve which is elastically deformable in the radial direction is fitted onto the outer circumference surface of a shank portion of a subholder body of the subholder. The subholder is coupled with the main sleeve such that the outer circumferential surface of the tapered sleeve having a taper of 1/10 intimately contacts the circumferential surface of the tapered hole and the rear end surface of a flange of the subholder body intimately contacts the forward end surface of the main sleeve. This structure prevents the generation of vibrations during machining. Also, the tool holder makes it possible to efficiently machine a workpiece at high speed, and to increase the durability of the tool and the spindle.

15 Claims, 5 Drawing Sheets

TOOL HOLDER

BACKGROUND OF THE INVENTION

1. Field of the Invention

The present invention relates to a tool holder which is detachably attached to a spindle of a machine tool, and particularly to a tool holder composed of a main sleeve to be attached to the spindle, and a subholder which is detachably attached to the main sleeve.

2. Description of Related Art

A main spindle of a machine tool such as a machining center is provided at its forward end with a tapered bore for receiving a tool holder. Conventionally, a taper of 7/24, i.e., a taper angle slightly larger than 16° has been widely used as an international standard for the tapered bore. Accordingly, the shank portion of each tool holder is designed to have a taper of 7/24 to conform to the taper of the tapered bore.

A tool holder composed of a main sleeve and a subholder has been used. The main sleeve of the tool holder has a tapered shank which is inserted into a tapered bore of a spindle, and a tapered hole which is provided at the forward end of the tapered shank to receive the subholder. The tapered shank of the main sleeve has the same steep taper as the tapered bore of the spindle (i.e., a taper of 7/24), while the tapered hole of the main sleeve has a gentle taper of 1/10, i.e., a taper angle slightly larger than 5°. The subholder has a hollow tapered shank which has the same taper angle as the tapered hole of the main sleeve. The tapered shank of the subholder is removably inserted into the tapered hole of the main sleeve to fix the subholder to the main sleeve.

The tool holder composed of the main sleeve and the subholder can be attached to a tapered bore which is widely used for spindles of machine tools. Also, since the tapered shank of the subholder is hollow, the tapered shank can be closely fitted into the tapered hole of the main sleeve by utilizing elastic deformation of the tapered shank. This increases the concentricity between the main sleeve and the subholder which are coupled with each other via the gentle taper of 1/10. However, the hollow tapered shank of the subholder tends to elastically deform due to a cutting force in a radial direction so that distortion and bending are produced in the tool holder. Also, it is difficult to obtain a well balanced rotation. Accordingly, the conventional tool holder has the drawback that a workpiece made of metal cannot be machined at high speed using a cutting tool attached to the subholder.

SUMMARY OF THE INVENTION

An object of the present invention is to solve the above-mentioned problems and to provide a tool holder comprising a main sleeve and a subholder, which can be attached to a tapered bore of a spindle which is widely used in machine tools, and which allows a tool to machine a workpiece at high speed.

Another object of the present invention is to provide a durable tool holder which can be used for a prolonged period of time without wear.

Still another object of the present invention is to provide a tool holder which can prevent the generation of vibrations such as chatter.

The present invention provides a tool holder which includes a main sleeve, a subholder, and a clamping means. The main sleeve has a tapered shank which is to be inserted into a tapered bore of a spindle of a machine tool, a flange which is provided at the forward end of the tapered shank and which has a diameter larger than that of the tapered shank, and a tapered hole formed in the forward end surface of the main sleeve and having a taper angle smaller than that of the tapered shank. The subholder comprises a subholder body, a tapered sleeve and an elastic member. The subholder body has a shank portion and a flange portion provided at the forward end of the shank portion. The tapered sleeve, which is elastically deformable in the radial direction, is fitted onto the outer circumferential surface of the shank portion of the subholder body in an axially movable manner. The elastic member is disposed between the tapered sleeve and the flange portion of the subholder body. The clamping means draws the subholder toward the rear end of the main sleeve, so that the rear end surface of the flange portion of the subholder body intimately contacts the forward end surface of the main sleeve and so that the outer circumferential surface of the tapered sleeve intimately contacts the circumference surface of the tapered hole of the main sleeve, thereby removably coupling the subholder with the main sleeve.

In the tool holder of the present invention, the tapered shank of the main sleeve can have a large taper angle, i.e., a steep taper, for example, a taper of 7/24. Accordingly, the taper angle can be made the same as that of the tapered bore which is widely used for the spindles of machine tools such as machining centers. This makes it possible to attach the tapered shank of the tool holder to a spindle of a machine tool in a state in which the tapered shank of the main sleeve intimately contacts the circumferential surface of the tapered bore of the spindle, and the rear end surface of the flange formed at the forward end of the tapered shank contacts the forward end surface of the spindle. This structure increases the stability of the tool holder.

The tapered hole formed in the forward end portion of the main sleeve and the tapered sleeve fitted onto the shank portion of the subholder preferably have a taper angle of 4°–12°, and more preferably a taper of 1/10. In this case, the rear end surface of the flange portion of the subholder intimately contacts the forward end surface of the main sleeve, the outer circumferential surface of the tapered sleeve intimately contacts the circumferential surface of the tapered hole of the main sleeve, and the main sleeve and the subholder are coupled with each other by the clamping means. Due to this structure, a difference is produced between the natural frequency of the main sleeve and the natural frequency of the subholder when the tool holder is used. This decreases vibrations due to resonance, so that it is possible to prevent the generation of vibrations such as chatter, which would otherwise occur during machining by using a tool, such as an end mill or a boring bar, attached to the subholder.

Also, since the elastically deformable tapered sleeve is fitted onto the shank portion of the subholder body of the subholder in an axially movable manner, the inner circumferential surface and the outer circumferential surface of the tapered sleeve intimately contact the shank portion and the circumferential surface of the tapered hole of the main sleeve, respectively, so that the coupling strength is increased. Hence, the generation of vibrations during high speed machining can be prevented.

Moreover, since the elastic member is interposed between the tapered sleeve and the flange portion of the subholder body of the subholder, a buffering action takes place between the tapered sleeve and the flange portion. This also prevents the generation of vibrations during machining.

The tool holder according to the present invention makes it possible to efficiently machine a workpiece at high speed while providing a machined surface having no roughness, and to prevent a tool and the spindle from being damaged due to wear or cracks, so that the tool and spindle can be used for a prolonged period of time.

Preferably, the tapered sleeve is provided with a slit formed over its entire length, and the slit is filled with an elastic material such as rubber.

Due to the slit formed over the entire length of the tapered sleeve, the tapered sleeve can elastically deform easily. Also, the elastic material in the slit provides a damping function, which prevents vibrations of the tool holder.

The clamping means of the tool holder may comprise a female screw formed at a bore portion of the main sleeve, and a male screw formed at the rear end of the shank portion of the subholder. The male screw of the subholder is screw-engaged with the female screw of the main sleeve and is tightened, so that the outer circumferential surface of the tapered sleeve intimately contacts the circumferential surface of the tapered hole of the main sleeve, and the outer circumferential surface of the shank portion intimately contacts the circumferential surface of the bore portion at an axially intermediate portion of the shank portion.

This structure makes it possible to couple the subholder with the main sleeve without using a draw bolt or a similar part. Also, the outer circumferential surface of the shank portion intimately contacts the circumferential surface of the bore portion at an axially intermediate portion of the shank portion, i.e., between the male screw portion and the tapered sleeve. This also prevents vibrations.

The clamping means of the tool holder may comprise a draw bolt which penetrates a hole formed at the forward end portion of the main sleeve, and a threaded hole formed at the rear end portion of the shank portion of the subholder. The tip of the draw bolt is screw-engaged with the threaded hole of the subholder and is tightened, so that the outer circumferential surface of the tapered sleeve of the subholder intimately contacts the circumferential surface of the tapered hole of the main sleeve.

This structure facilitates the manufacture of the subholder.

The clamping means may comprise a pull stud which has a flange portion supported by the rear end surface of the main sleeve and a male screw formed at the forward end portion thereof, and a threaded hole formed at the rear end portion of the shank portion of the subholder. The male screw of the pull stud is screw-engaged with the threaded hole of the subholder and is tightened, so that the outer circumferential surface of the tapered sleeve of the subholder intimately contacts the circumferential surface of the tapered hole of the main sleeve.

With this structure, the attachment of the subholder can be performed by using the pull stud having an extended length, without using the above-mentioned draw bolt. Accordingly, the number of parts can be reduced.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF PREFERRED EMBODIMENTS

Embodiments of the present invention will now be described with reference to the accompanying drawings.

First Embodiment

Figure 1:
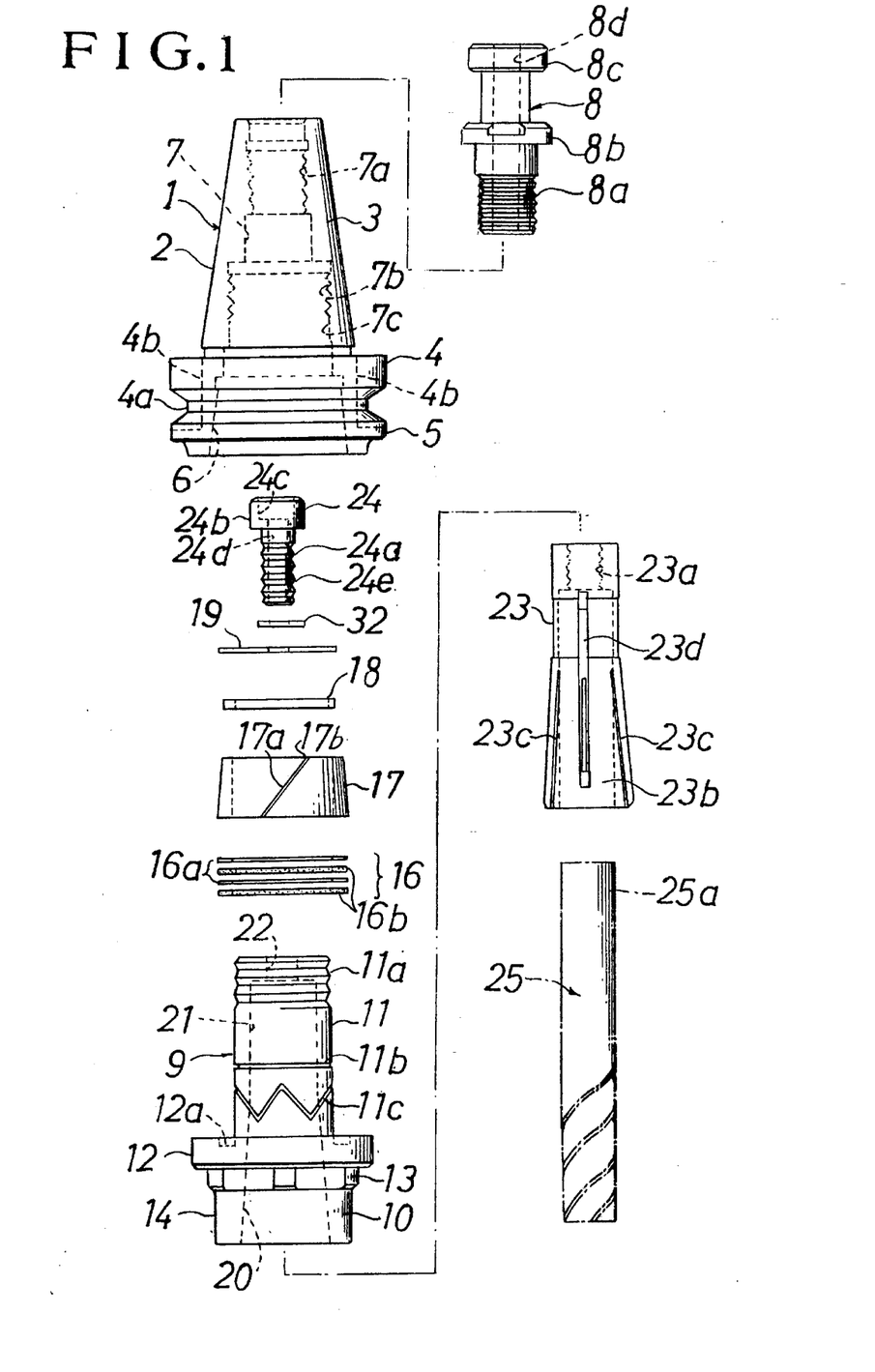
FIG. 1 is an exploded side view of a tool holder according to a first embodiment of the present invention.
Figure 2:
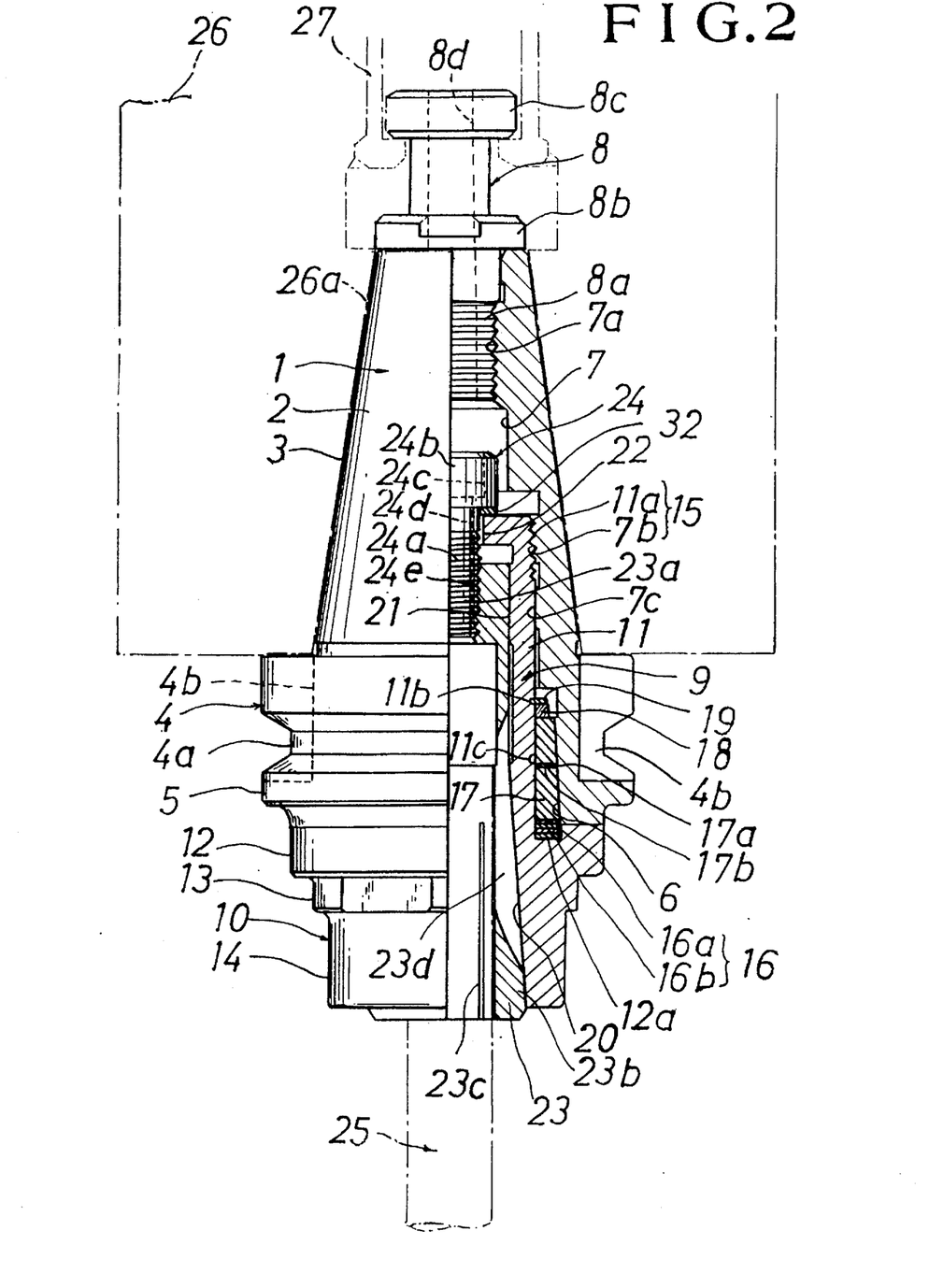
FIG. 2 is a partially sectioned side view of the tool holder shown in FIG. 1.
Figure 3:
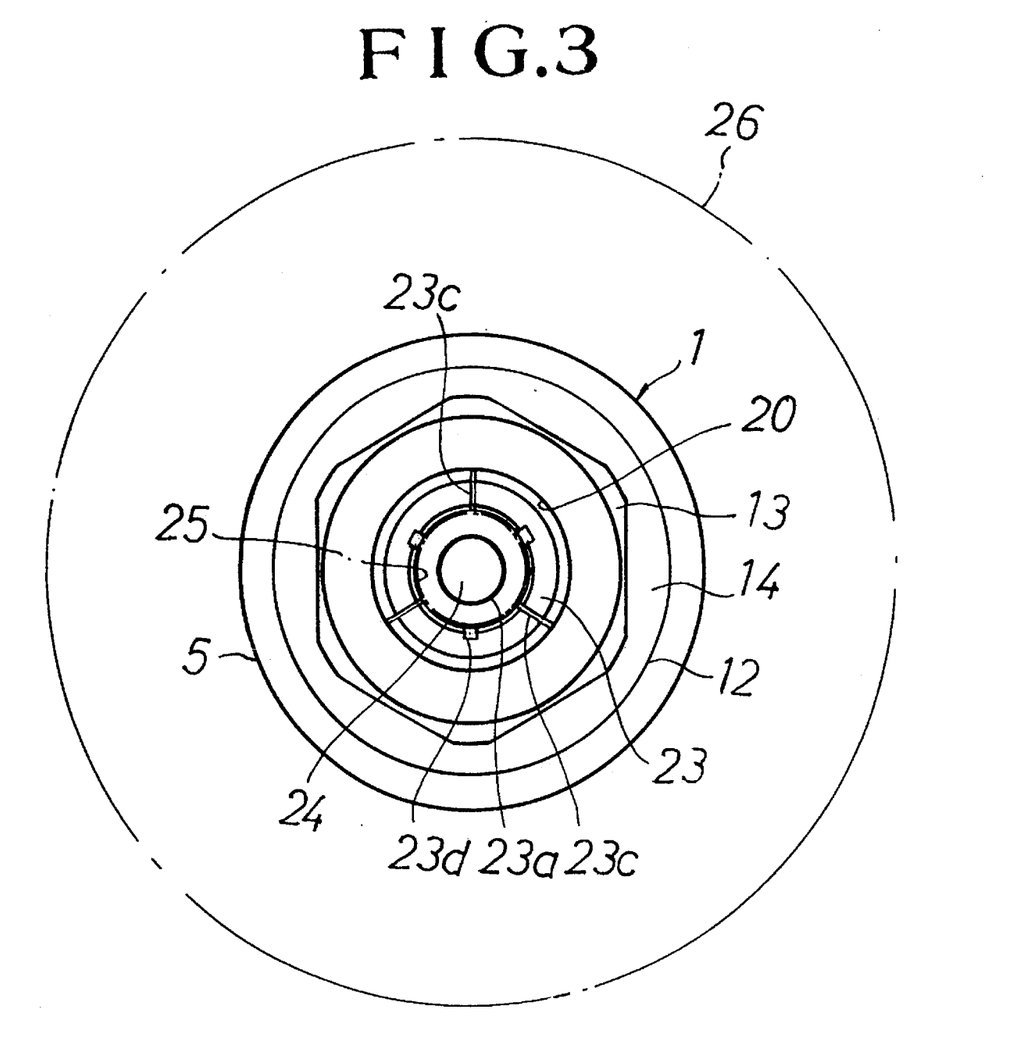
FIG. 3 is a bottom view of the tool holder shown in FIG. 1.

FIGS. 1–3 show a tool holder according to a first embodiment of the present invention.

As shown in FIGS. 1–3, the tool holder includes a main sleeve 1 and a subholder 9.

The main sleeve 1 includes a sleeve body 2 having a tapered shank 3 formed at the base portion thereof. The tapered shank 3 has a large axial length and a steep taper of 4/27, i.e., a taper angle of 16° 34' 40". A flange 4 having a diameter larger than that of the tapered shank 3 is provided at the forward end of the tapered shank 3. Also, an annular seat 5 having a diameter smaller than that of the flange 5 is provided on the forward side of the flange 4. The flange 4 may be integrally formed with the sleeve body 2 or fixed to the sleeve body 2 by shrinkage-fitting the rear end portion of the flange 4 onto the sleeve body 2. A tapered hole 6 is formed from the forward end surface of the sleeve body 2. This tapered hole 6 has a short axial length and a gentle taper of 1/10, i.e., a taper angle of 5° 43'.

Although a bore 7 is formed in the sleeve body 2 such that the bore 7 extends from the rear end surface of the sleeve body 2 to the rear end of the tapered hole 6, the sleeve body 2 is substantially a rigid body. A threaded hole 7a is formed at the rear end portion of the bore 7, and a male screw portion 8a of a pull stud 8 is screwed into the threaded hole 7a. The pull stud 8 is provided with a flange portion 8b which is formed at the axially intermediate position thereof and which contacts the rear end surface of the sleeve body 2, and a pulling portion 8c which projects outward from the rear end surface of the sleeve body 2. Also, a cutting fluid passage 8d is formed in the pull stud 8 such that the passage 8d axially penetrates the center portion of the pull stud 8. A female screw 7b is formed at the intermediate portion of the bore 7, and an elevated support portion 7c is formed between the female screw 7b and the tapered hole 6.

The flange 4 is provided with a groove 4a having a trapezoidal cross section with which an arm of an automatic tool changer (ATC) is engaged. The flange 4 also has a pair of key grooves 4b.

The subholder 9 has a subholder body 10, and a straight shank portion 11 is formed at the rear end of the subholder body 10. A flange portion 12 having a diameter larger than that of the shank portion 11 is integrally formed at the forward end of the shank portion 11. A nut-shaped portion 13 and a tip portion 14 are projected from the forward end of the flange portion 12.

A male screw 11a is formed at the rear end portion of the straight shank portion 11, and is screw-engaged with the female screw 7b of the sleeve body 2. The female screw 7 and the mail screw 11a form a clamping means 15, which removably couples the subholder 9 with the main sleeve 1.

An annular groove 11b is formed in the outer circumferential surface of the straight shank portion 11 at an axial position shifted from the axially central portion toward the flange portion 12. Also, an annular depression 12a is formed in the rear end surface of the flange portion 12 such that the annular depression 12a is located adjacent to the outer circumferential surface of the shank portion 11. An elastic member 16 which will be described later is fitted into the annular depression 12a. A tapered sleeve 17 is fitted onto the outer circumferential surface of the shank portion 11 to be rotatable and axially movable. The forward end surface of the tapered sleeve 17 abuts on the elastic member 16. A washer 18 for preload adjustment is fitted onto the shank portion 11 such that it contacts the rear end surface of the tapered sleeve 17. Also, a snap ring 19 is fitted into the annular groove 11b of the shank portion 11 so as to press the tapered sleeve 17 against the elastic member 16 via the washer 18, thereby compressing the elastic member 16 and giving a preload thereto.

The elastic member 16 is formed by combining a plurality of incompressible rings 16a made of metal such as steel, and a plurality of compressible rings 16b made of a synthetic rubber, a soft urethane resin, or a soft fluorine-containing resin. Although disc springs may be used as the compressible rings, rings made of synthetic rubber or soft resin are preferable.

The tapered sleeve 17 has a straight inner circumferential surface and a tapered outer circumferential surface having the same taper angle as the tapered hole 6 of the sleeve body 2. The tapered sleeve 17 has a short axial length, and a slit 17a is formed over the entire length of the tapered sleeve 17 such that the slit 17a inclines with respect to the center axis of the tapered sleeve 17. The slit 17a is filled with an elastic material 17b such as silicone, nylon, or synthetic rubber. This structure allows the tapered sleeve 17 to elastically deform in the radial direction. The elastic material 17b is charged into the slit 17a such that it does not project from the outer circumferential surface of the tapered sleeve 16. Also, the elastic material 17b may be charged into the slit 17a such as to expand the slit 17a, thereby expanding the tapered sleeve 17 in the radial direction.

A lubricant holding groove 11c which has a sawtooth wave-like shape and which is continuous in the circumferential direction is formed in the outer circumferential surface of the shank portion 11 at an axial position where the tapered sleeve 17 is situated. Lubricant such as lubricant oil or grease is applied to the lubricant holding groove 11c. This guarantees smooth relative movement between the shank portion 11 and the tapered sleeve 17 for a prolonged period of time.

A collet holding bore 20 having a taper of 7/24 is formed in the subholder body 10 such that it penetrates the center portion of the flange portion 12 and reaches the forward end surface of the tip portion 14. A bolt insertion hole 22 having a small diameter is formed at the rear end of the subholder body 10, and a straight bore 21 is formed between the bolt insertion hole 22 and the collet holding bore 20. That is, the collet holding bore 20, the straight bore 21, and the both insertion hole 22 are successively formed to be coaxial with the center axis of the subholder body 10. The intermediate and rear end portions of the straight bore 21 have slightly larger diameters.

A tapered collet 23 serving as a tool holding means is inserted into the collet holding bore 20 from its forward end. A collet draw bolt 24 having a male screw 24e at its shaft portion 24a is inserted into the bolt insertion hole 22 from its rear end. The male screw 24e is then screw-engaged with the female screw 23a. The collet 23 is provided with a tapered portion 23b at its forward end. The tapered portion 23b has an outer circumferential surface having a taper of 7/24 which is the same as the collet holding bore 20. Three slits 23c are formed in the collet 23 at constant intervals in the circumferential direction. Also, a cutting fluid supply opening 23d is formed between every two adjacent slits 23c in the circumferential direction.

The slits 23c are formed such that they axially extend from the forward end of the collet 23 to a position near the rear end of the taper portion 23b, while the cutting fluid supply openings 23d are formed such that they have an elongated shape extending from the forward end of the tapered portion 23b to a position near the rear ends of the slits 23c. In the collet draw bolt 24, a hexagonal hole 24c is formed in a head portion 24b, and a cutting fluid passage 24d is formed at the center of the collet draw bolt 24 such that the fluid passage 24d axially penetrates the center portion of the bolt 24 from the bottom of the hexagonal hole 24c to the forward end of the screw portion 24e. Numeral 32 denotes a washer.

The subholder member 10 of the subholder 9 is inserted into the sleeve body 2 of the main sleeve 1, so that the tapered sleeve 17 on the straight shank portion 11 of the subholder member 10 is received by the tapered hole 6 of the sleeve body 2. After fixing the sleeve body 2 with a proper means, a spanner or the like is engaged with the nut-shaped portion 13 of the subholder body 10, and the subholder body 10 is turned. With this operation, the male screw 11a formed at the rear end portion of the straight shank portion 11 is screw-engaged with the female screw 7b formed in the inner circumferential surface of the sleeve body 2 and is then tightened so as to couple the subholder 9 with the main sleeve 1, thereby completing the assembly of the tool holder. After that, the spanner or the like is removed, and the sleeve body 2 is released from the fixed state.

The coupling between the main sleeve 1 and the subholder 9 is performed such that the entire forward end surface of the sleeve body 2 intimately contacts the rear end surface of the flange portion 12 of the subholder body 10, and the entire outer circumference of the tapered sleeve 17 fitted onto the straight shank portion 11 of the subholder body 10 intimately contacts the circumferential surface of the tapered hole 6 of the sleeve body 2. Also, the outer circumferential surface of the shank portion 11 intimately contacts the circumferential surface of the elevated support portion 7c of the bore 7 at the axially intermediate portion between the male screw 11a and the tapered sleeve 17.

When the tapered sleeve 17 is press-inserted toward the rear end of the tapered hole 6, the elastic member 16 is axially compressed, and the tapered sleeve 17 elastically deforms in the radial direction, because the slit 17a is formed over the entire length of the tapered sleeve 17. As a result, the inner circumferential surface of the tapered sleeve 11 intimately contacts the shank portion 11, while the outer circumferential surface of the tapered sleeve 17 intimately contacts the circumferential surface of the tapered hole 6.

The shank portion 25a of a tool 25 such as an end mill or boring bar is inserted into the tapered collet 23 fitted into the subholder body 10. After that, the tip of a hand tool such as an L-shaped wrench having a hexagonal cross section (not illustrated) is inserted into the cutting fluid passage 8d of the pull stud 8 fixed to the sleeve body 2 from the rear end of the passage. The tip of the hand tool is then engaged with the hexagonal hole 24c of the collet draw bolt 24. Subsequently, the hand tool is manually rotated to draw the tapered collet 23 toward the rear end of the subholder body 10, so that the collet 23 elastically deforms to reduce its inner diameter. With this operation, the shank portion 25a of the tool 25 is clamped by the collet 23. The attachment of the tool 25 to the subholder 9 is performed in the above-described manner.

After the attachment of the tool 25, the hand tool is pulled out of the tool holder. When the tool 25 is removed, the draw bolt 24 is loosened by using the above-mentioned wrench or the like to allow the collet 23 to return to its original shape. After that, the tool 25 is pulled out of the collet 23.

When the tool holder of the first embodiment to which the tool 25 is attached is used, the tool holder is attached to a tool storage magazine of an automatic tool changer provided in a machine tool such as a machining center. During a machining operation, a tool change arm of the automatic tool changer grips the trapezoidal groove 4a of the flange 4 of the main sleeve 1, takes out the tool holder from the tool storage magazine, and transfers it to the spindle 26 of the machine tool. Subsequently, the automatic tool changer inserts the tool holder into the tapered bore 26a formed at the forward end portion of the spindle 26. As described above, the tapered bore 26a of the spindle 26 has a taper of 7/24.

Then, the pulling portion 8c of the pull stud 8 of the main sleeve 1 is gripped by a draw means 27 provided in the spindle 26, and is then drawn toward the interior of the spindle 26. With this operation, the outer circumferential surface of the tapered shank 3 of the main sleeve 1 intimately contacts the circumferential surface of the tapered bore 26a, and the rear end surface of the flange 4 of the main sleeve 1 intimately contacts the forward end surface of the spindle 26. Also, a pair of unillustrated drive keys fixed to the spindle 26 is engaged with the pair of key grooves 4b formed in the flange 4.

After that, the tool change arm releases the flange 4, and returns to its original position. The spindle 26 of the machine tool is then rotated to machine a workpiece using the tool 25 attached to the tool holder.

When a cutting fluid must be supplied during the above-described machining operation, the cutting fluid is supplied from the spindle 26 to the tool holder via the cutting fluid passage 8d of the pull stud 8. The cutting fluid flows through the inside of the sleeve body 2, the hexagonal hole 24c and cutting fluid passage 24d of the collet draw bolt 24 and enters the interior of the tapered collet 23. The cutting fluid is then supplied to the tool 25 through the cutting fluid supply openings 23d. The cutting fluid from the cutting fluid supply openings 23d is also supplied to a portion of a workpiece where machining is performed by the tool 25. When the tool holder is attached to the spindle 26, an illustrated pressurized air supply apparatus may be operated to supply pressurized air into the tapered bore 26a so as to clean the tapered bore 26a and the like.

After completion of machining of the workpiece, the tool holder is returned to the original position together with the spindle 26. After that, the draw means 27 releases the pull stud 8, and the arm of the automatic tool changer takes out the tool holder from the spindle 26 and returns it to the tool storage magazine.

Second Embodiment

Figure 4:
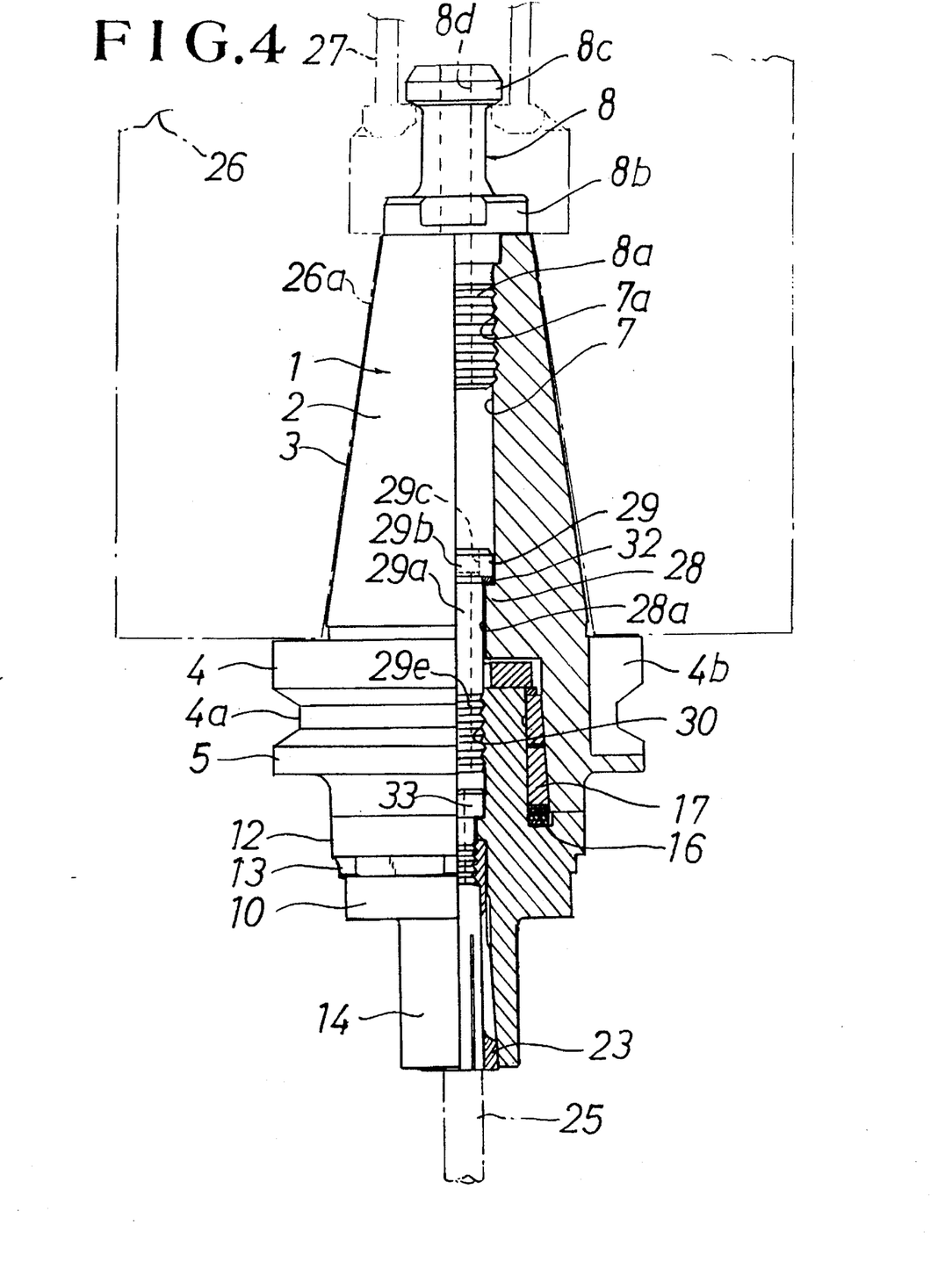
FIG. 4 is a partially sectioned side view of a tool holder according to a second embodiment of the present invention.

A tool holder according to a second embodiment of the present invention will now be described with reference to FIG. 4. In FIG. 4, reference numerals which are the same as those used in FIGS. 1–3 denote the same or corresponding portions.

In the tool holder according to the second embodiment, a forward end support portion 28 is formed on the inner circumferential surface of the sleeve body 2 of the main sleeve 1 at an axial position sifted from the flange 4 toward the rear end of the sleeve body 2. The shaft portion 29a of a subholder draw bolt 29 is inserted through a hole 28a formed in the support portion 28. A male screw 29e of the shaft portion 29a is screw-engaged with a threaded hole 30 which is formed in the rear end portion of the straight shank portion 11 of the subholder body 10 such that the threaded hole 30 extends along the center axis of the shank portion 11. The subholder draw bolt 29 is then tightened to draw the subholder body 10 toward the rear end of the sleeve body 2. With this operation, the entire outer circumference of the tapered sleeve 17 fitted onto the straight shank portion 11 of the subholder body 10 intimately contacts the circumferential surface of the tapered hole 6 of the sleeve body 2, and the entire forward end surface of the sleeve body 2 intimately contacts the rear end surface of the flange portion 12 of the subholder body 10. The subholder draw bolt 29 and the threaded hole 30 of the straight shank portion 11, with which the subholder draw bolt 29 is engaged, form the clamping means.

The length of the straight shank portion 11 is made shorter than that in the first embodiment, and the diameter of the threaded hole 30 is made larger than the diameter of the head portion 24b of the collet draw bolt 24. Also, a hexagonal hole 29c and a cutting fluid passage 29d are formed in the subholder draw bolt 29. This structure makes it possible to operate the bolts 29 and 24 from the rear end of the tool holder by using large and small wrenches.

The remaining portions of the tool holder of the second embodiment are the same as those in the first embodiment.

Third Embodiment

Figure 5:
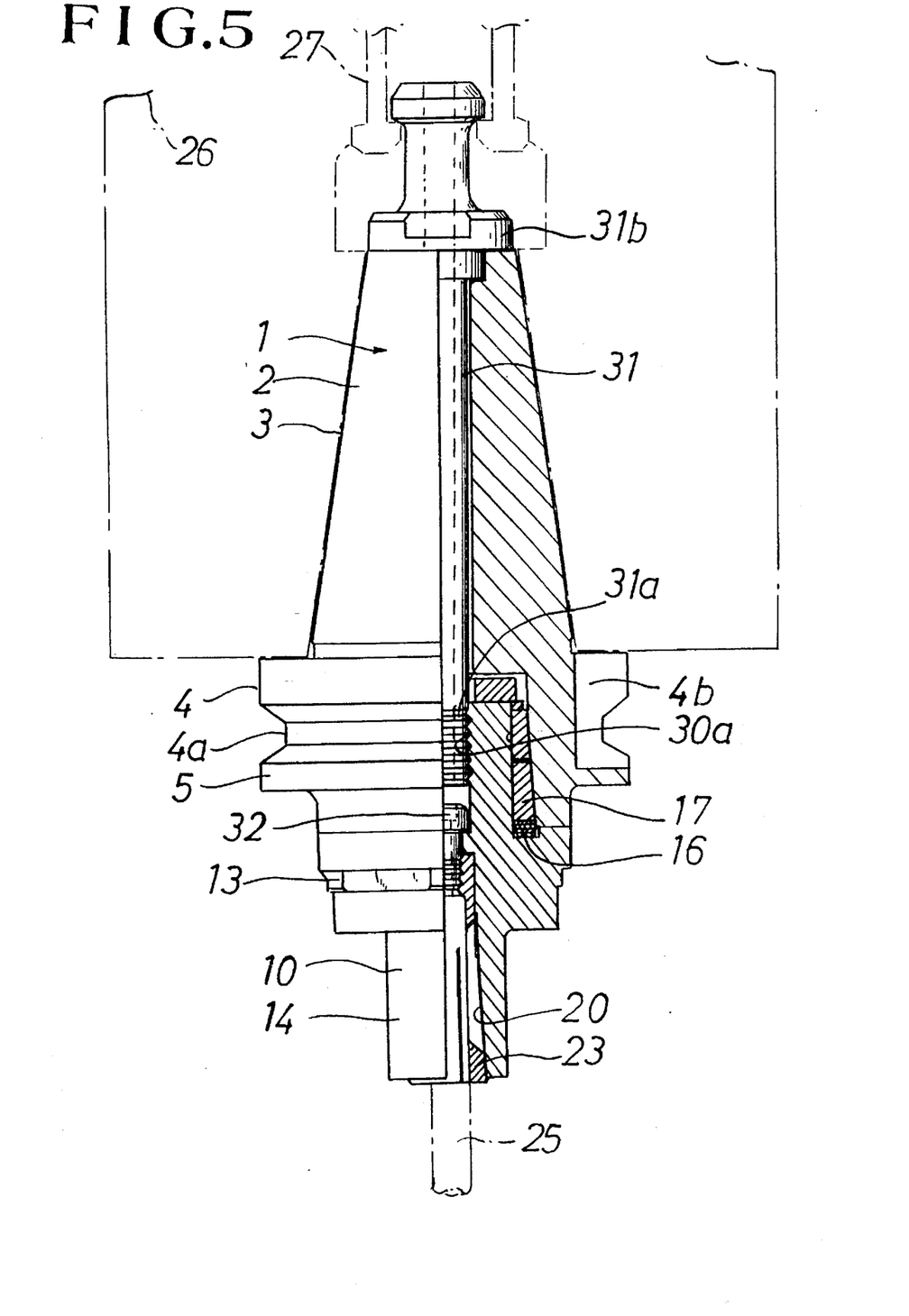
FIG. 5 is a partially sectioned side view of a tool holder according to a third embodiment of the present invention.

A tool holder according to a third embodiment of the present invention will now be described with reference to FIG. 5. In FIG. 5, reference numerals which are the same as those used in FIGS. 1–4 denote the same or corresponding portions.

In the tool holder according to the third embodiment, a pull stud 31 is extended toward the forward end of the tool holder, and a male screw 31a is formed at the forward end of the pull stud 31. The male screw 31a is screw-engaged with the threaded hole 30 which is formed in the rear end portion of the straight shank portion 11 of the subholder body 10, and is tightened. Also, a flange portion 31b of the pull stud 31 is supported by the rear end surface of the sleeve body 2 of the main sleeve 1. The remaining portions of the tool holder of the third embodiment are the same as those in the second embodiment. The pull stud 31 and the threaded hole 30 of the straight shank portion 11, with which the pull stud 31 is engaged, form the clamping means.

The tool holders according to the second and third embodiments can be used in the same manner as in the first embodiment.

In the tool holders according to the first, second and third embodiments, the tapered shank 3 of the sleeve body 2 of the main sleeve 1 has a taper of 7/24, i.e., a taper angle slightly larger than 16°. Accordingly, the tool holders can be attached to the tapered bore 26a of the spindle 26 which is widely used in machine tools. Also, the tapered hole formed in the forward end portion of the sleeve body 2 of the main sleeve 1 and the tapered sleeve 17 fitted onto the straight shank portion 11 of the subholder body 10 of the subholder 9 have a taper of 1/10, i.e., a taper angle slightly larger than 5°. Moreover, the subholder 9 is inserted into and held by the main sleeve 1 in a state in which the rear end surface of the flange portion 12 of the subholder body 10 intimately contacts the forward end surface of the sleeve body 2, the outer circumferential of the tapered sleeve 17 of the subholder body 10 intimately contacts the circumferential surface of the tapered hole 6 of the sleeve body 2. Due to this structure, a difference is produced between the natural frequency of the main sleeve 1 and the natural frequency of the subholder 9 when the tool holder is used. This decreases vibrations due to resonance, so that it is possible to prevent the generation of vibrations such as chatter, which would otherwise occur during machining by using the tool 25 attached to the subholder 9.

Also, the subholder 9 is provided with the elastic member 16 which is formed by combining the compressible rings 16b and the incompressible rings 16a with no axial clearance. Therefore, the inner circumferential surface and the outer circumferential surface of the tapered sleeve 17 of the subholder body 10 intimately contact the shank portion 11 of the subholder body 10 and the circumferential surface of the tapered hole 6 of the main sleeve 1, respectively, so that the coupling strength is increased, and therefore, the generation of vibrations during high speed machining can be prevented.

Moreover, since the elastic member 16 is interposed between the tapered sleeve 17 and the flange portion 12 of the subholder body 10, a buffering action takes place between the tapered sleeve 17 and the flange portion 12. This also prevents the generation of vibrations during machining.

Since the tapered sleeve 17 is provided with a slit 17a formed over its entire length, the tapered sleeve 17 elastically deforms. That is, when the subholder 9 is coupled with the main sleeve 1, the diameter of the tapered sleeve 17 decreases, and the coupling between the subholder 9 and the main sleeve 1 is loosened, the diameter of the tapered sleeve 17 increases. Accordingly, in the coupled state, the tapered sleeve 17 intimately contacts the outer circumferential surface of the shank portion 11 and the circumferential surface of the tapered hole 6 of the sleeve body 2, respectively. In a state in which the coupling is loosened, the tapered sleeve 17 is allowed to increase its diameter by elastic restoring force. This assists the action of pushing out the tapered sleeve 17 from the tapered hole 6 of the sleeve body 2. In addition, since the tapered sleeve 17 can be smoothly moved in the axial direction relative to the shank portion 11 by the action of the lubricant, the subholder 9 can be easily taken out of the main sleeve 1.

In the first, second and third embodiments, the tapered sleeve 17 has a gentle taper of 1/10. So, a high coupling strength can be obtained. That is, the coupling strength can be increased by decreasing the taper angle. It is preferred that the tapered sleeve 17 has a taper angle in the range of 4°–12°.

Also, the elastic material 17b such as rubber is charged into the slit 17a formed over the entire length of the tapered sleeve 17. This elastic material 17b also provides a damping function, which prevents vibrations of the tool holder.

In the tool holder of the first embodiment, the subholder 9 is coupled with the main sleeve 1 by tightening the male screw 11a formed at the rear end of the shank portion 11 of the subholder body 11 which is screw-engaged with the female screw 7b of the sleeve body 2 of the main sleeve 1.

Accordingly, no additional part is required to couple the subholder 9 with the main sleeve 1. Also, the outer circumferential surface of the shank portion 11 intimately contacts the circumferential surface of the bore portion 7 of the sleeve body 2 at the axially intermediate portion of the shank portion 11. This structure is also useful to prevent vibrations due to resonance.

In the tool holder of the second embodiment, the subholder can be easily manufactured. In the tool holder of the third embodiment, the subholder 9 is coupled with the main sleeve 1 by using the pull stud 31 having an extended length. Accordingly, the subholder draw bolt used in the second embodiment can be omitted to reduce the number of parts.

The tool holder of the first embodiment was tested as follows. The tool holder of the first embodiment was attached to the spindle of a machining center with a spindle motor of 5.5 kw, and a four-blade, cemented carbide end mill having a diameter of 16 mm was attached to the subholder. Dry down cut milling of 200 m/min was performed for a workpiece of S55C in the state in which the spindle was rotated at 4000 rpm. No vibration was observed, and machining was performed smoothly. Also, the chips were produced continuously and were smoothly discharged. The sharpness of the cemented carbide end mill was good after the use. The cemented carbide end mill had a durability or service life 3 to 5 times the durability or service life in the case where a conventional tool holder is used.

Also, boring was performed by using the above tool holder. In this case, a boring bar with a cutting chip was attached to the tool holder, and boring was performed for a workpiece of SCM21 at a speed of 160–500 m/min. No chip damage was observed.

The tool holders of the second and third embodiments were tested in similar manner. Results similar to those obtained by using the tool holder of the first embodiment were obtained.

The results of these tests demonstrate that the rotational speed of the spindle and the speed of machining can be increased by using the tool holder of the present invention.

The structure of the tool holder according to the present invention may be modified to securely transmit the drive force from the main sleeve to the subholder. That is, a pair of drive keys may be fixed to the forward end surface of the main sleeve and a pair of key grooves with which the drive keys are engaged may be formed in the flange portion of the subholder.

In the above described embodiment, the drive force is transmitted from the spindle to the main sleeve via the drive keys. However, other means may be used for transmitting the drive force.

Also, the tool holding means provided in the subholder is not limited to the tapered collet, and other holding mechanisms may be used.

Obviously, numerous modifications and variations of the present invention are possible in light of the above teachings. It is therefore to be understood that within the scope of the appended claims, the present invention may be practiced otherwise than as specifically described herein.

What is claimed is:

1. A tool holder comprising:
   a main sleeve having a tapered shank which is to be inserted into a tapered bore of a spindle of a machine tool, a flange provided at the forward end of said tapered shank and having a diameter larger than that of said tapered shank, and a tapered hole formed in the forward end surface of said main sleeve and having a taper angle smaller than that of said tapered shank;

a subholder comprising a subholder body having a shank portion and a flange portion provided at the forward end of said shank portion, a tapered sleeve which is elastically deformable in the radial direction and is fitted onto the outer circumferential surface of said shank portion of the subholder body in an axially movable manner, and an elastic member disposed between said tapered sleeve and said flange portion of said subholder body, said elastic member comprising a plurality of alternating compressible and incompressible rings; and a clamping means for drawing said subholder toward the rear end of said main sleeve, so that the rear end surface of said flange portion of said subholder body intimately contacts the forward end surface of said main sleeve and the outer circumferential surface of said tapered sleeve intimately contacts the circumferential surface of said tapered hole of said main sleeve, thereby removably coupling said subholder with said main sleeve.

2. A tool holder according to claim 1, wherein said tapered shank of said main sleeve has a taper angle of about 16° and said tapered hole of said main sleeve and said tapered sleeve of said subholder have a taper angle of 4°–12°.

3. A tool holder according to claim 2, wherein said tapered hole of said main sleeve and said tapered sleeve of said subholder have a taper angle of about 5°.

4. A tool holder according to claim 1, wherein said tapered sleeve is provided with a slit formed over the entire length of said tapered sleeve, and said slit is filled with an elastic material such as rubber.

5. A tool holder according to claim 1, wherein said clamping means comprises:

a female screw formed at a bore portion of said main sleeve; and a male screw formed at the rear end of said shank portion of said subholder, wherein the male screw of said subholder is screw-engaged with the female screw of said main sleeve and is tightened, so that the outer circumferential surface of said tapered sleeve intimately contacts the circumferential surface of said tapered hole of said main sleeve, and the outer circumferential surface of said shank portion intimately contacts the circumferential surface of said bore portion at an axially intermediate portion of said shank portion.

6. A tool holder according to claim 1, wherein said clamping means comprises:

a draw bolt which penetrates a hole formed at the forward end portion of said main sleeve; and a threaded hole formed at the rear end portion of said shank portion of said subholder, wherein the tip of said draw bolt is screw-engaged with said threaded hole of said subholder and is tightened, so that the outer circumferential surface of said tapered sleeve of said subholder intimately contacts the circumferential surface of said tapered hole of said main sleeve.

7. A tool holder according to claim 1, wherein said clamping means comprises:

a pull stud which has a flange portion supported by the rear end surface of said main sleeve and a male screw formed at the forward end portion thereof; and a threaded hole formed at the rear end portion of said shank portion of subholder, wherein the male screw of said pull stud is screw-engaged with said threaded hole of said subholder and is tightened, so that the outer circumferential surface of said tapered sleeve of said subholder intimately contacts the circumferential surface of said tapered hole of said main sleeve.

8. A tool holder according to claim 1, wherein said tapered sleeve has a slit formed over the entire axial length of said tapered sleeve, said slit inclined with respect to a center axis of said tapered sleeve.

9. A tool holder according to claim 8, wherein said slit in said tapered sleeve is filled with an elastic material.

10. A tool holder according to claim 9, wherein said elastic material is charged into said slit such that it does not project from the outer circumferential surface of said tapered sleeve.

11. A tool holder according to claim 10, wherein said elastic material is charged into said slit in a manner to expand said slit and thereby expand said tapered sleeve in the radial direction.

12. A tool holder comprising:

a main sleeve having a tapered shank which is to be inserted into a tapered bore of a spindle of a machine tool, a flange provided at the forward end of said tapered shank and having a diameter larger than that of said tapered shank, and a tapered hole formed in the forward end surface of said main sleeve;

a subholder comprising a subholder body having a shank portion and a flange portion provided at the forward end of said shank portion, a tapered sleeve which is elastically deformable in the radial direction and is fitted onto the outer circumferential surface of said shank portion of the subholder body in an axially movable manner, and an elastic member disposed between said tapered sleeve and said flange portion of said subholder body, said tapered sleeve having a slit formed over the entire axial length of said tapered sleeve, said slit inclined with respect to a center axis of said tapered sleeve; and a clamping means for drawing said subholder toward said main sleeve, so that said flange portion of said subholder body intimately contacts the forward end surface of said main sleeve said tapered sleeve is seated in said tapered hole of said main sleeve.

13. A tool holder according to claim 12, wherein said slit in said tapered sleeve is filled with an elastic material.

14. A tool holder according to claim 13, wherein said elastic material is charged into said slit such that it does not project from the outer circumferential surface of said tapered sleeve.

15. A tool holder according to claim 14, wherein said elastic material is charged into said slit in a manner to expand said slit and thereby expand said tapered sleeve in the radial direction.

* * * * *